Nov. 8, 1938.    T. DINKINS    2,135,802
AUTOMOBILE TIRE HANDLING DEVICE
Filed May 20, 1937
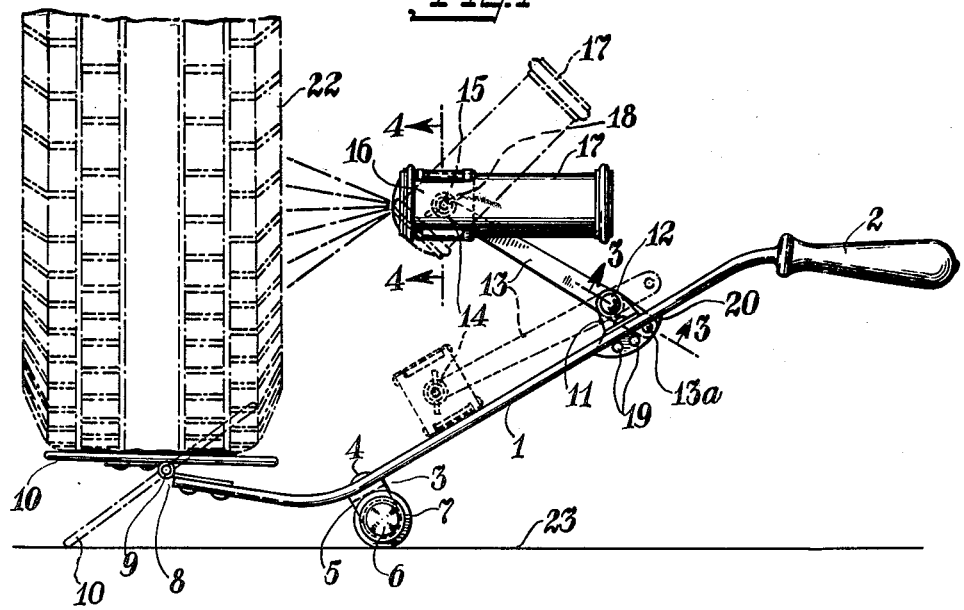
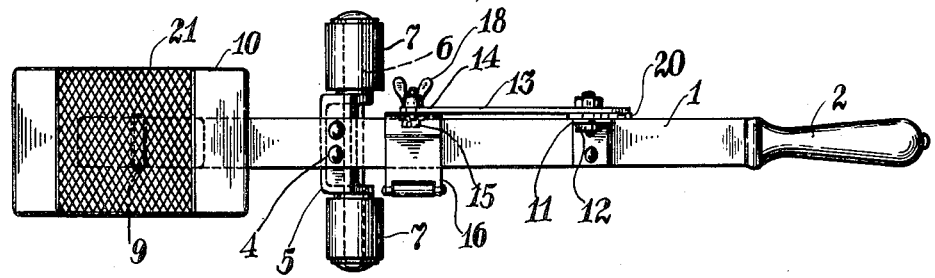
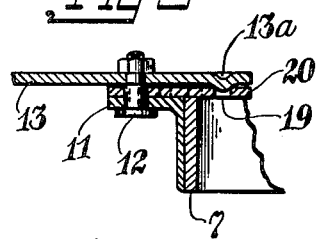 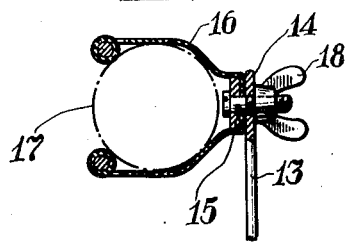
INVENTOR
*Thomas Dinkins.*
BY
*Benjamin Roman.*
ATTORNEY Patented Nov. 8, 1938

2,135,802

UNITED STATES PATENT OFFICE 2,135,802

AUTOMOBILE TIRE HANDLING DEVICE

Thomas Dinkins, Ridgefield Park, N. J.

Application May 20, 1937, Serial No. 143,742

1 Claim. (Cl. 280—53)

This invention relates to a device for handling automobile tires while they are being mounted upon or demounted from their wheels. At the present time such tires, particularly of trucks, are very heavy to handle in such circumstances, and the difficulties are greatly increased when the tire is muddy or during rain, precipitation, or darkness. The weight and size of the tire often injures the clothes and hands of the person handling it, and at times render it difficult to properly mount the tire.

The principal object of the invention is to remedy the aforementioned difficulties and disadvantages, and to provide a device wherewith the tire may be handled with ease, convenience, and efficiency during the mounting and demounting, and which will greatly aid in the speedy and correct mounting of the tire upon its wheel.

Other objects and advantages will hereinafter appear.

In the accompanying drawing,—

Fig. 1 is a side elevation of the device constituting the invention.

Fig. 2 is a plan view of the device shown in Fig. 1.

Figs. 3, 4 are fragmentary cross-sectional views, in an enlarged scale, showing details of the device.

The device comprises an operating lever 1 having a working handle 2, and at its fulcrum 3 there is secured thereto, by means of bolts 4, a fitting 5 carrying an axle 6 on which is mounted a pair of rollers 7, as shown in Fig. 2. To the operating terminal 8 of lever 1 is secured a hinge 9, to which is in turn secured a platform 10, whereby the latter is swingable about said hinge and hence tiltable to either any angular state as indicated by the dash and dot lines, Fig. 1, or to the horizontal operative position shown. The lever 1 is provided with a lug 11 to which is pivoted at 12 a bracket 13 at the end 14 of which is pivoted by a bolt 15 a spring cleat 16 adapted to grasp and receive a usual flash lamp 17, a thumb-nut 18 threading over said bolt and against bracket 13 to thereby permit tilting of cleat 16 and securing it in any such position for adjusting the lamp 17 to any one of a plurality of inclinations as indicated by the dash and dot lines as shown. At its opposite terminal the bracket 13 is provided with a pin 13ᵃ which resiliently engages any one of a series of holes 19 formed in a plate 20 secured to the lug 11, whereby the bracket 13 may be either disposed to an inoperative position against the lever 1, as indicated by the dash and dot lines, or to an erected operative position as shown by the engagement of pin 13ᵃ with one of the holes 19, as illustrated in Figs. 1, 3. The working surface 21 of platform 10 is knurled as shown in Fig. 2.

When it is required to handle the tire 22 the car is jacked up in the usual manner and the device is shoved up thereto so that the sustaining platform 10 thereof slips underneath the deflated tire shoe. The user may then press down upon the lever handle 2 with one hand and while thus easily relieving or neutralizing the surplus weight of the tire he may with his other hand grip the upper portion of the tire, and draw both the tire and the device, while its traction wheels 7 roll on the ground 23, to thereby readily and conveniently demount the tire and rim from the wheel, the weight of the tire meanwhile continuing to hold it soundly to the knurled surface of the landing platform 10. When remounting the inflated tire, or in changing of tires, the above described operation may be reversed, the tire being first positioned upon the hinged platform 10, then elevated by pressure upon the handle 2, and then rolled with the device into place for mounting on the wheel in accurate alignment. While the device is not in use, or when using it in light situations the bracket 13 may be maintained inoperatively against the lever 1, and when used under dark conditions the bracket with its socket 16 may be erected and adjusted to hold the lamp 17 as required in aid of the mounting and demounting operations.

Variations may be resorted to within the scope of the invention, and portions of the improvements may be used without others.

Having thus described my invention, I claim:—

An automobile tire handling device having the combination of an operating lever composed of a single elongated metallic bar of a length adapted to permit simultaneous grasping of its operating end with one hand, shoving its actuating end underneath the tire, while gripping the tire with the other hand, a traction roller mounted on said lever between its ends to constitute its fulcrum, said actuating end being bent substantially upwardly relatively to said lever, and a tire sustaining platform being centrally pivoted to swing about the terminal of said actuating end to permit it to assume a substantially level position closely adjacent to the ground when shoved under and in contact with the tire.

THOMAS DINKINS.